(12) United States Patent
Mitterlehner

(10) Patent No.: US 11,378,246 B2
(45) Date of Patent: Jul. 5, 2022

(54) LIGHT MODULE FOR A MOTOR VEHICLE HEADLIGHT

(71) Applicant: ZKW Group GmbH, Wieselburg (AT)

(72) Inventor: Stefan Mitterlehner, Mank (AT)

(73) Assignee: ZKW Group GmbH, Wieselburg (AT)

( * ) Notice: Subject to any disclaimer, the term of this patent is extended or adjusted under 35 U.S.C. 154(b) by 0 days.

(21) Appl. No.: 17/602,349

(22) PCT Filed: Mar. 16, 2020

(86) PCT No.: PCT/EP2020/057066
§ 371 (c)(1),
(2) Date: Oct. 8, 2021

(87) PCT Pub. No.: WO2020/207706
PCT Pub. Date: Oct. 15, 2020

(65) Prior Publication Data
US 2022/0163182 A1  May 26, 2022

(30) Foreign Application Priority Data

Apr. 11, 2019 (EP) .................................... 19168608

(51) Int. Cl.
*F21S 41/675* (2018.01)
*F21S 41/32* (2018.01)
(Continued)

(52) U.S. Cl.
CPC ............. *F21S 41/675* (2018.01); *F21S 41/32* (2018.01); *F21S 41/153* (2018.01); *F21S 41/16* (2018.01)

(58) Field of Classification Search
CPC .. F21S 41/153; F21S 41/16; F21S 41/32–365; F21S 41/67–698
See application file for complete search history.

(56) References Cited

U.S. PATENT DOCUMENTS 10,584,842 B2 *  3/2020  Park ..................... G06V 20/584
2019/0056080 A1   2/2019  Mayer et al.
2019/0390833 A1  12/2019  Stein et al.

FOREIGN PATENT DOCUMENTS

DE        10344173 A1    4/2005
FR         3008477 A1    1/2015
(Continued)

OTHER PUBLICATIONS

International Search Report for PCT/EP2020/057066, dated Jun. 16, 2020 (12 pages).
(Continued)

*Primary Examiner* — Jason M Han
(74) *Attorney, Agent, or Firm* — Eversheds Sutherland (US) LLP

(57) ABSTRACT

Light module for a motor vehicle headlight, comprising a lighting device (2) generating light beams with a predefined beam path (3), a light deflection device (4) which is downstream of the lighting device (2) for deflecting the predefined beam path (3), and a spatial light modulator (5) downstream of the light deflection device (4), as seen in the direction of the light beams, wherein the light deflection device (4) directs essentially all light beams incident on the light deflection device (4) to the spatial light modulator (5) to generate an illumination pattern (6) to be emitted on the spatial light modulator (5), as well as an imaging system (7) which is set up to reproduce the illumination pattern (6) in the form of a light distribution in front of the light module, wherein the light deflection device (4) comprises a light-deflecting element (40) and an adjusting system (41), wherein the adjusting system (41) is set up to pivot the light-deflecting element (40) about at least two intersecting pivot axes (H, V), thus altering the beam path (3') between
(Continued)

the light deflection device (4) and the spatial light modulator (5).

18 Claims, 2 Drawing Sheets

(51) Int. Cl.
    *F21S 41/16*     (2018.01)
    *F21S 41/153*     (2018.01)

(56) References Cited

FOREIGN PATENT DOCUMENTS

| FR | 3062458 A1 | 8/2018 |
| FR | 3063396 A1 | 8/2018 |
| JP | 2016091976 A | 5/2016 |

OTHER PUBLICATIONS

Search Report for European Patent Application No. 19168608.8 dated Nov. 18, 2019 (15 pages).

\* cited by examiner

LIGHT MODULE FOR A MOTOR VEHICLE HEADLIGHT

The invention relates to a light module for a motor vehicle headlight, wherein the light module comprises a lighting device which—in the operating state of the light module—generates light beams with a predefined beam path, a light deflection device which is downstream of the lighting device for deflecting the predefined beam path, a spatial light modulator downstream of the light deflection device, as seen in the direction of the light beam, wherein the light deflection device—in the operating state of the light module—essentially directs all the light beams incident on the light deflection device to the spatial light modulator to produce an Illumination pattern to be emitted on the spatial light modulator, as well as an imaging system designed to reproduce the Illumination pattern in the form of a light distribution in front of the light module.

In addition, the invention relates to a motor vehicle headlight with at least one such light module.

Light modules of the aforementioned type are known from the prior art. In the known light modules, the light deflection device is fixed in position relative to the spatial light modulator.

As a result, it is extremely difficult to change the position of the light focus or to compensate for distortions in the light distribution caused by lens tolerances or errors of the imaging system.

In addition, the entire mirror matrix of the spatial light modulator is contained in the Illumination pattern, resulting in a so-called "lighting overfill" or a so-called "overfill region". The overfill region is caused by the light which falls on the spatial light modulator but not on the mirror matrix. This reduces optical efficiency.

The object of the present invention is to provide a light module in which distortions of the light distribution can be reduced while optical efficiency remains constant or increases.

According to the invention, the aforementioned object is achieved with a light module of the aforementioned type in that the light deflection device comprises a light-deflecting element and an adjusting system, wherein the adjusting system is set up to pivot the light-deflecting element about at least two intersecting pivot axes and thereby change the beam path between the light deflection device and the spatial light modulator. For example, the beam path between the light deflection device and the spatial light modulator can be rotated or tilted, resulting in a shift of the Illumination pattern on the spatial light modulator and consequently in a change in the position of the Illumination pattern relative to the mirror matrix of the spatial light modulator. This makes it possible to change the overfill region but also to shift the light focus (at the spatial light modulator) and to compensate for the distortions of the light distribution, depending on whether the light-deflecting element is pivoted about a first, a second or both pivot axes. The beam path between the light deflection device and the spatial light modulator is the predefined beam path deflected by the light deflection device.

The adjusting system may, for example, be mechanical and/or driven by an electric motor and comprise mechanical elements and/or elements driven by an electric motor.

It is advantageous if the light beams directed onto the spatial light modulator by the light deflection device converge or diverge.

With regard to changing the imaging scale, it may be advantageous if the adjusting system is additionally set up to displace the light-deflecting element along a third axis, namely a so-called displacement axis, wherein the displacement axis preferably extends perpendicular to the at least two intersecting pivot axes. This can, for example, make it possible to vary the size of the illumination pattern to be emitted and to simplify adjusting/reducing the overfill region.

When the light beams directed to the spatial light modulator by the light deflection device converge, a distance between the light deflection device and the spatial light modulator can be increased to reduce the size of the illumination pattern to be emitted. However, when the light beams directed to the spatial light modulator by the light deflection device diverge, a distance between the light deflection device and the spatial light modulator can be reduced to reduce the size of the illumination pattern to be emitted.

In a preferred embodiment, the light deflection device may further comprise a support frame in which the light-deflecting element is enclosed, wherein the adjusting system is in engagement with the support frame and is set up to pivot the support frame, and the light-deflecting element enclosed therein, about the at least two intersecting pivot axes and thereby change the beam path between the light deflection device and the spatial light modulator.

The adjusting system also may have three adjusting screws, for example ball screws.

In this context, it may be useful if the adjusting screws are driven mechanically and/or by an electric motor.

It may be expedient if the at least two intersecting pivot axes are orthogonal to each other, wherein the at least two intersecting pivot axes are preferably a vertical axis and a horizontal axis. Preferably, a plane is defined by the at least two separating axes, which extends orthogonally to the main radiation direction of the light module.

The light module can be advantageously designed as a projection light module. This means that the illumination pattern is projected directly in front of the light module by the imaging system without further optical elements being positioned downstream of the imaging system in the light module, and that preferably only lenses and, optionally, apertures, but no reflectors, are used in the imaging system for forming the beam. This type of light modules is known in the prior art as light modules based on the projection principle.

In a preferred embodiment, the light-deflecting element may be designed as a curved mirror.

It is advantageous if the curved mirror is a concave (i.e. inwardly curved) mirror.

In addition, it is advantageous if the light-reflecting surface of the curved mirror has an essentially parabolic and/or hyperbolic shape. It should be noted that a two-dimensional surface can have a parabolic (along a first direction) and a hyperbolic (along a second direction) shape at the same time.

Further advantages arise when the light-reflecting surface of the curved mirror has two axes of symmetry, wherein the light-reflecting surface preferably is designed symmetrically with respect to one or both of the two axes of symmetry, wherein preferably a first axis of symmetry extends horizontally and a second axis of symmetry extends vertically. The axes of symmetry can be used to define a two-dimensional coordinate system on the light-reflecting surface of the mirror. For example, the surface may have a parabolic or hyperbolic shape along the first axis of symmetry. Likewise, the surface may have a parabolic or hyperbolic shape along the second axis of symmetry, such that, for example, a mirror is conceivable that is essentially hyperbolic along one direction and parabolic along another direction.

Particularly advantageous is the embodiment in which each axis of symmetry coincides with the respective pivot axis. When adjusting, i.e. redirecting, the beam path, no or as little distortion as possible is generated, which could be caused, for example, by the "swerving" of the mirror about the adjustment axis.

With regard to the available installation space, it may be advantageous if the light-deflecting element—in the operating state of the light module—scatters backwards the light beams incident on the light-deflecting element relative to the direction of incidence of the light beams incident on the light-deflecting element.

It may be expedient if the displacement axis extends essentially parallel to a main emitting direction of the light module.

In addition, it is expedient if the lighting device generates essentially parallel light beams.

The spatial light modulator may preferably be designed as a digitally controllable micro-mirror device, for example as a DMD chip.

In addition, it is advantageous if the light deflection device is set up to essentially direct all light beams incident on the light deflection device to the spatial light modulator in the form of a converging or non-diverging beam.

In addition, it may be advantageous if all components of the light module, with the exception of the light deflection device, in their mounted state are arranged in the light module such that they are rigid, i.e. not movable. This results in the advantage that only one optical element—the light deflection device—is required for adjusting the light module, wherein all other components, such as the LED light sources, the DMD, the lenses, etc., are in fixed positions relative to each other.

It is advantageous if the lighting device comprises one or more light sources, for example semiconductor-based light sources, such as LED light sources or laser diodes having, for example, light-converting means upstream of the laser diodes for converting the laser light of a predefined colour into essentially white light.

It may be useful if the light sources are arranged in a matrix, for example in a 1×2 matrix, 2×3 matrix or 3×4 matrix. This makes it possible, for example, to increase the robustness of the light module. If, for example, one of the light sources fails, the remaining light sources can either still provide sufficient light output to generate a legally compliant light distribution or a minimum emergency light distribution, by means of which a region in front of the light module can still be sufficiently illuminated to be able to drive to the nearest service station, for example.

In a preferred, advantageous embodiment, each light source is upstream of one or more optics for shaping the light generated by this light source.

It may be expedient if the optics is/are designed and/or arranged such that they capture most of the light emitted by the light sources and direct it into the subsequent optics or to the light-deflecting element.

In one embodiment, the optics are designed as expansion optics or as collimator optics.

The adjusting system is preferably designed as a adjusting triangle system (see, e.g., the applications EP 2803528 A1, A 50797/2015 by the applicant).

In the context of the present invention, the term "adjusting triangle system" is generally understood to refer to an adjusting system which adjusts an apparatus to be adjusted via three actuators (e.g. adjusting screws). The three actuators of the adjusting triangle system engage with the apparatus to be adjusted, whereby three engagement points are formed, which define a triangle—an adjusting triangle.

Spatial light modulators are a type of micro-mirror actuators in which the modulation of light is carried out via a mirror matrix. The mirror matrix is usually arranged on a semiconductor chip, wherein the number of mirrors can vary, for example, from a few hundred to several million mirrors. Controlled by a microcontroller, the individual mirrors in the matrix can assume (discrete) displacements over time. This makes it possible to deflect partial beams or to achieve a phase-shifting effect. Using a matrix arrangement, spatial light modulators can deflect the light from a light source in such a manner that an image or a light distribution is projected (by means of an imaging system). Examples of spatial light modulators are the Digital Micromirror Device (DMD), which is the technological basis of products such as Digital Light Processing (DLP).

The invention and other advantages are explained in more detail below on the basis of exemplary embodiments, which are illustrated in the drawings. In these, FIG. 1 is an exploded view of a light module;

To simplify legibility, the drawings are provided with reference axes where expedient. These reference axes refer to an appropriate installation position of the subject matter of the invention in a motor vehicle and represent a motor vehicle-related coordinate system.

In addition, it should be clear that direction-related terms such as "horizontal", "vertical", "top", "bottom", etc. are to be understood in connection with the present invention to have a relative meaning and refer either to the aforementioned appropriate installation position of the subject matter of the invention in a motor vehicle or to a customary orientation of a radiated light distribution in the light image or in the space to be travelled through.

Figure 1:
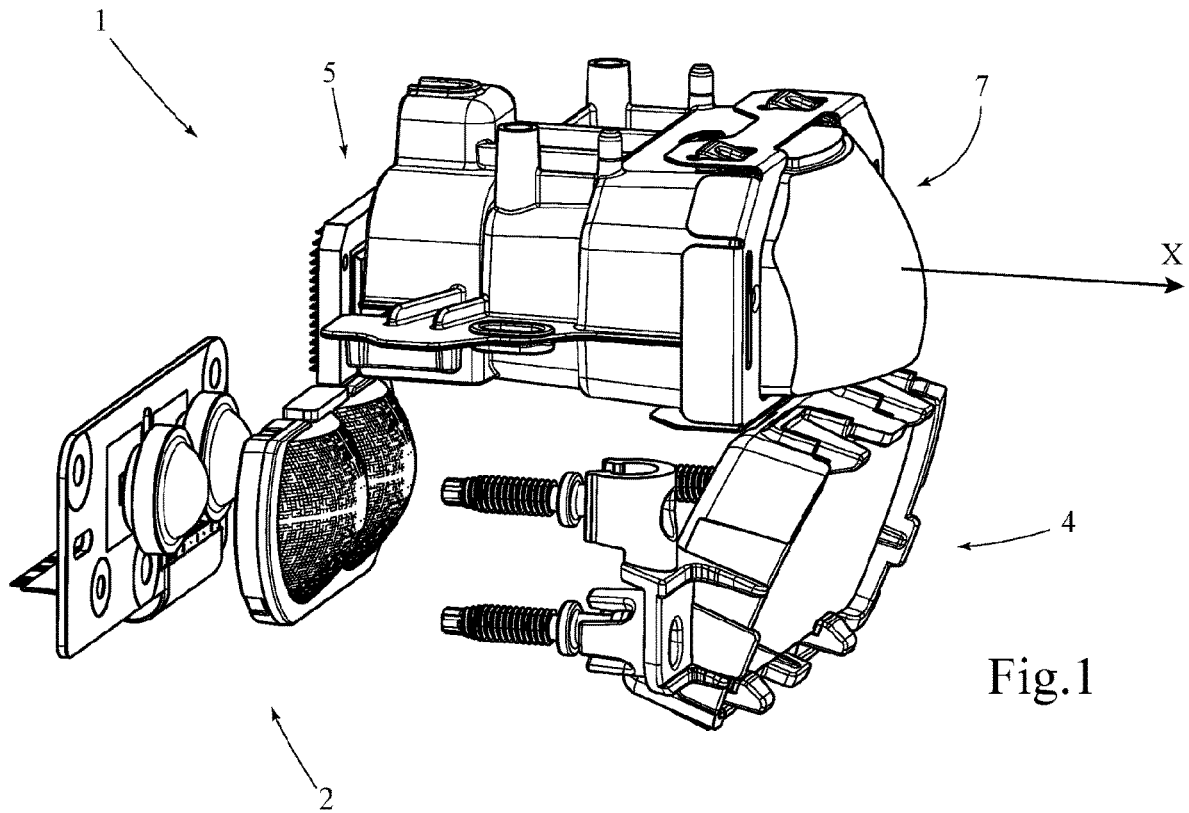
Figure 2:
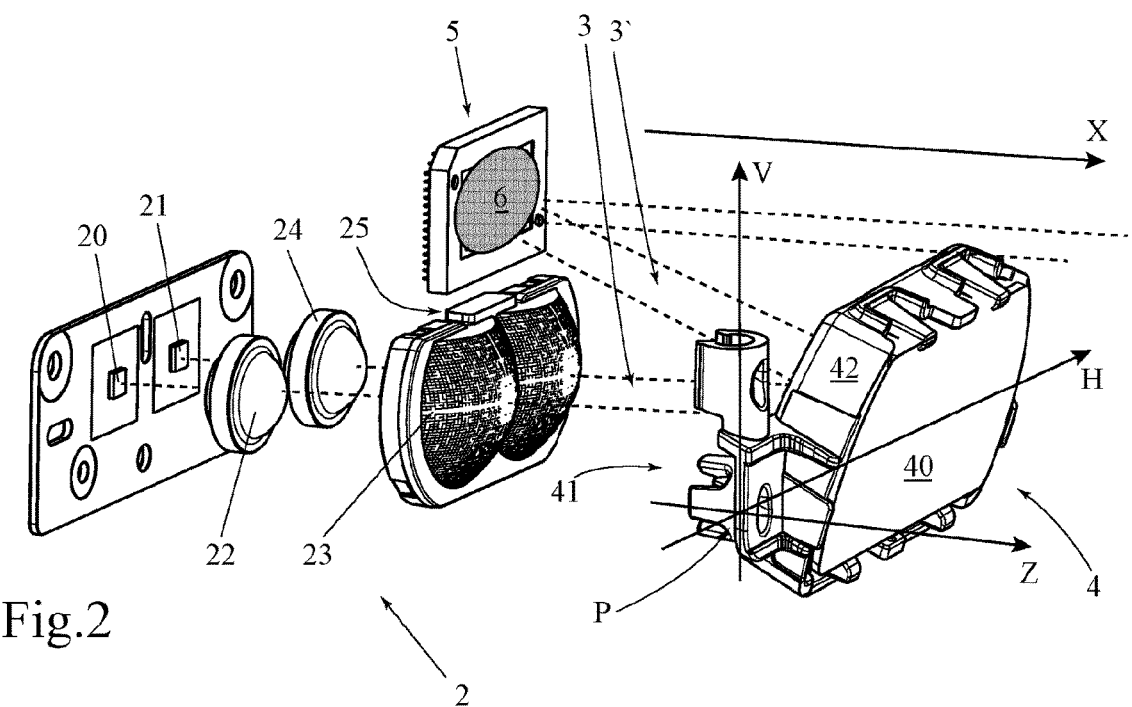
FIG. 2 shows an enlarged section of the exploded view of FIG. 1.

First, reference is made to FIGS. 1 and 2. These show a light module 1 for a motor vehicle headlight which corresponds to the light module according to the invention. The light module 1 comprises a lighting device 2. The lighting device 2 generally can comprise one or more light sources, 20, 21, for example semiconductor-based light sources, such as LED light sources or laser diodes having, for example, light-converting means upstream of the laser diodes for converting the laser light of a predefined colour into essentially white light. The light sources 20, 21 can be arranged like a matrix—FIGS. 1 and 2, for example, show a 1×2 matrix of LED light sources 20, 21. Each light source 20, 21 can generally be upstream of one or more optics 22, 23, 24, 25 for shaping the light produced by this light source 20, 21. Preferably, optics 22 and 24 make it possible to capture most of the light emitted by the light sources 20, 21 and direct it into the subsequent optics 23, 25. FIGS. 1 and 2 show that respective expansion optics 22 or 24 and collimator optics 23 or 25 may be downstream of each light source 20 and 21, wherein the respective expansion optics 22, 24 shape the light emitted by the corresponding light source 20, 21 into a diverging light beam and the collimator optics 23, 25 collimate the diverging light beam. In general, the lighting device 2 generates light beams with a predefined beam path 3. Preferably, the light beams extend essentially parallel.

The light beams generated by the lighting device 2 propagate in the direction of a light deflection device 4, which is downstream of the lighting device 2 for deflecting the predefined beam path 3.

The light deflection device 4 deflects the light beams to a spatial light modulator 5. The spatial light modulator 5 is therefore downstream of the light deflection device 4. Herein, the light deflection device 4 essentially deflects all light beams incident on it to the spatial light modulator 5, whereby an illumination pattern 6 is generated on the spatial light modulator 5.

As already mentioned, the displacement of individual micro-mirrors of the spatial light modulator 5 can be changed. As a result, the illumination pattern 6 can be modified. In this way, ADB functions of the light module can be realized, for example.

Furthermore, the light module 1 comprises an imaging system 7, which is upstream of the spatial light modulator 5 and is set up to display the illumination pattern 6 in the form of a light distribution (not shown here) in front of the light module. As there are no other optical elements between the spatial light modulator 5 and the imaging system 7, and as the imaging system 7 contains only lenses and, optionally, apertures as optical elements, the light module 1 is a light module of the projection type.

FIG. 1 shows an imaging system 7, which is designed as a lens comprising two or more lens elements enclosed in a lens holder. The lens shown has three lens elements. However, the imaging system can also be designed as a single-element lens, for example a free-form lens. All (non-displaced) micro-mirrors of the spatial light modulator 5 preferably are (completely) positioned in a focal plane of the imaging system 7.

The light deflection device 4 has a light-deflecting element 40 which may be facing both the lighting device 2 and the spatial light modulator 5. In addition, the light deflection device comprises an adjusting system 41, which is set up to pivot the light-deflecting element 40 about at least two pivot axes H, V intersecting in a point P, thus altering the beam path 3' between the light deflection device 4 and the spatial light modulator 5. The beam path 3' between the light deflection device 4 and the spatial light modulator 5 is the predefined beam path 3 deflected and, preferably, modified by the light deflection device 4. The at least two intersecting pivot axes H, V can, for example, be positioned orthogonally to each other; preferably, one of them extends vertically and the other horizontally. This means that the light-deflecting element 40 can be adjusted, e.g. pivoted, rotated or tilted, by means of the adjusting system 41 when adjusting or setting the light module 1. This can, for example, change the position of the illumination pattern 6 on the spatial light modulator 5. The light deflection device 4 can preferably not only deflect the incident light beams but also cause them to run toward each other (converge) or away from each other (diverge).

In addition, the adjusting system 41 may be set up for displacing the light-deflecting element 40 along a third displacement axis Z which extends perpendicular to the at least two intersecting pivot axes H, V. The displacement axis Z can extend parallel to the main emitting direction X of the light module 1, as shown in FIGS. 1 and 2. This can be used to change the size of the illumination pattern 6 on the spatial light modulator 5.

The illumination pattern 6 (on the spatial light modulator 5) can be displaced and/or tilted by pivoting, twisting or tilting about one or both pivot axes H, V.

The illumination pattern 6 can be enlarged or reduced, or its scale can be changed, by displacing it along the displacement axis Z, which can also change, for example, the image scale of the light module. FIG. 2, by way of example, shows that the illumination pattern 6 has an aforementioned overfill region. By means of displacement along the displacement axis Z, this overfill region can be reduced up to the point at which it is eliminated.

This light deflection device 4 can furthermore comprise a support frame 42, such as a fitting. The light-deflecting element 40 is held (fixed) or enclosed in the support frame 42. The adjusting system 41 can be in engagement with the support frame 42 and be set up to pivot the support frame 42, together with the light-deflecting element 40 enclosed therein, about the at least two intersecting pivot axes H, V, and can optionally be set up to displace it along the displacement axis Z.

Figure 3:
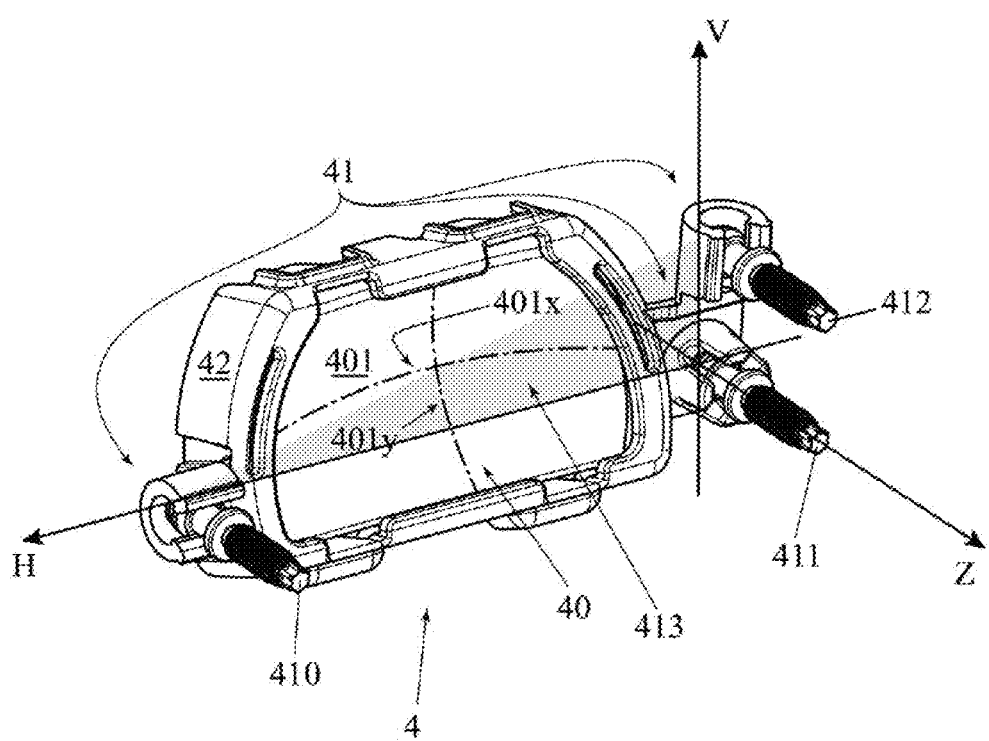
FIG. 3 shows a light deflection device of the light module of FIG. 1.

As already mentioned, the adjusting system 41 is preferably designed as an adjusting triangle system, which adjusts the light-deflecting element 40, which, for example, is enclosed in a support frame 42, via three adjusting elements, such as the adjusting screws 410, 411, 412. The adjusting screws 410, 411, 412, which are shown in FIGS. 1 and 3, are designed as ball screws, the heads of which are accommodated in the corresponding receiving means or sockets of the support frame 42. Thus, the adjusting screws are in engagement with the support frame 42, whereby three engagement points—also called support points—are formed, which in turn define a triangle 413—a so-called adjusting triangle. The actuators of the adjusting system 41 can also be directly engaged with the corresponding regions of the light-deflecting element 40—at appropriate support points—without the need for a support frame 42. These regions can also be designed like sockets or receiving means for heads of ball screws.

The actuators, such as the adjusting screws 410, 411, 412, can be driven mechanically or by means of an electric motor not shown here.

If one or two actuators are now adjusted (e.g. the ball screws are screwed in and out), the pivoting, rotating or tilting about one or both pivot axes H, V described above can be realized, whereby the illumination pattern 6 (on the spatial light modulator 5) can be displaced and/or tilted.

If all three actuators are adjusted (e.g. the ball screws are screwed in and out), the displacing along the displacement axis Z described above can be realized, whereby the illumination pattern 6 (on the spatial light modulator 5) can be enlarged or reduced.

FIG. 3 illustrates that the light-deflecting element 40 can be designed as a curved mirror, for example as a concave mirror. The light-reflecting surface 401 of the mirror—here, a concave mirror curved inwards—can have two axes of symmetry 401x, 401y. The light-reflecting surface 401 may have different or identical shapes along the different directions defined by the respective axes of symmetry 401x, 401y, such as parabolic and hyperbolic or parabolic and parabolic, and so on. The light-reflecting surface 401 may be designed symmetrically with respect to one or both of these axes of symmetry 401x, 401y. Preferably, a first axis of symmetry 401x extends horizontally and a second axis of symmetry 401y extends vertically. Each axis of symmetry 401x, 401y can coincide with the corresponding pivot axis H, V. For example, as shown in FIG. 3, the horizontal axis 401x can coincide with the horizontal pivot axis H and the vertical axis 401y with the vertical pivot axis V. This way, unwanted distortions can be kept low when the mirror is adjusted. The focal point of the curved mirror may, for example, be at the mirror matrix of the spatial light modulator 5.

The light-deflecting element 40 can also be designed as a mirror with a freeform reflector surface, wherein the shape of the mirror is adapted to the shape of the (desired) illumination pattern 6 on the spatial light modulator (on the DMD chip) 5.

It should be noted at this point that the distances between the lighting device 2 and the light deflection device 4 and between the light deflection device 4 and the spatial light modulator 5 may in principle be different, such that the overall size of the light module 1 can be adapted to different installation space specifications. As soon as the installation space is specified, the lighting device 2, the light deflection device 4, the spatial light modulator 5 and the imaging system 7 are placed in a fixed position relative to each other in order to meet the specification.

FIG. 3 shows that the light-deflecting element 40 can scatter backwards the light beams incident on the light-deflecting element 40 relative to the direction of incidence (X or Z) of the light beams incident on the light-deflecting element 40.

The spatial light modulator 5 is preferably designed as a digital micro-mirror device—DMD.

Generally, the light deflection device 2 can essentially direct all light beams incident on the light deflection device 2 to the spatial light modulator 5 in the form of a converging or non-diverging beam.

It is evident that modifications can be made to the previously described light module, and/or parts added to the same, without deviating from the field and scope of the present invention.

It is also evident that, although the invention has been described in reference to some concrete examples, a person skilled in the art should certainly be able to achieve many other corresponding forms of a light module which have the properties specified in the claims and which thus all are within the scope of protection determined by said claims.

The reference numbers in the claims merely serve for a better understanding of the present inventions and in no way constitute a limitation of the present inventions.

The invention claimed is:

1. A light module for a motor vehicle headlight, the light module comprising:
   a lighting device (2) set up for generating light beams with a predefined beam path (3);
   a light deflection device (4) which is downstream of the lighting device (2) for deflecting the predefined beam path (3);
   a spatial light modulator (5) downstream of the light deflection device (4), as seen in the direction of the light beams, wherein the light deflection device (4) configured to direct essentially all light beams incident on the light deflection device (4) to the spatial light modulator (5) to generate an illumination pattern (6) to be emitted on the spatial light modulator (5); and
   an imaging system (7) which is configured to reproduce the illumination pattern (6) in the form of a light distribution in front of the light module,
   wherein the light deflection device (4) comprises a light-deflecting element (40) within a support frame (42) and an adjusting system (41), wherein the adjusting system (41) is configured to pivot the support frame (42) of the light-deflecting element (40) about at least two intersecting pivot axes H, V, thus altering the beam path (3') between the light deflection device (4) and the spatial light modulator (5).

2. The light module according to claim 1, wherein the adjusting system (41) is additionally set up to displace the light-deflecting element (40) along a third axis, namely a so-called displacement axis (Z), wherein the displacement axis (Z) extends perpendicular to the at least two intersecting pivot axes (H, V), wherein the light beams directed to the spatial light modulator (5) by the light deflection device (4) in particular converge or diverge.

3. The light module according to claim 1, wherein the adjusting system (41) has three adjusting screws (410, 411, 412).

4. The light module according to claim 3, wherein the adjusting screws are configured to be driven mechanically and/or by an electric motor.

5. The light module according to claim 3, wherein the adjusting screws comprise ball screws.

6. The light module according to claim 1, wherein the at least two intersecting pivot axes (H, V) are positioned orthogonal to each other.

7. The light module according to claim 6, wherein the at least two intersecting pivot axes are a vertical axis (V) and a horizontal axis (H).

8. The light module according to claim 1, wherein the light-deflecting element (40) is designed as a curved mirror.

9. The light module according to claim 8, wherein the curved mirror is a concave mirror.

10. The light module according to claim 8, wherein the light-reflecting surface (401) of the curved mirror, which has an essentially parabolic and/or hyperbolic shape, has two axes of symmetry (401x, 401y), wherein the light-reflecting surface is symmetrical with respect to one or both of the two axes of symmetry (401x, 401y).

11. The light module according to claim 10, wherein a first axis of symmetry (401x) extends horizontally and a second axis of symmetry (401y) extends vertically.

12. The light module according to claim 10, wherein each axis of symmetry (401x, 401y) coincides with the corresponding pivot axis (H, V).

13. The light module according to claim 1, wherein the light-deflecting element (40) is configured to scatter backwards the light beams incident on the light-deflecting element (40) relative to the direction of incidence of the light beams incident on the light-deflecting element (40).

14. The light module according to claim 1, wherein all components of the light module (1), with the exception of the light deflection device (4), in their mounted state are arranged in the light module (1) such that they are not movable.

15. The light module according to claim 1, wherein the spatial light modulator (5) is a digitally controllable micro-mirror device.

16. The light module according to claim 15, wherein the digitally controllable micro-mirror device comprises a DMD chip.

17. The light module according to claim 1, wherein the light deflection device 4 is designed to direct essentially all light beams incident on the light deflection device 4 to the spatial light modulator (5) in the form of a converging beam.

18. Motor A motor vehicle headlight having at least one light module according to claim 1.

* * * * *